United States Patent
Karoum et al.

(10) Patent No.: US 12,436,123 B2
(45) Date of Patent: *Oct. 7, 2025

(54) XRF MEASUREMENTS OF MULTIPHASE OILFIELD FLUIDS

(71) Applicant: Schlumberger Technology Corporation, Sugar Land, TX (US)

(72) Inventors: Reda Karoum, Houston, TX (US); Carlos Abad, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 195 days.

This patent is subject to a terminal disclaimer.

(21) Appl. No.: 18/461,557

(22) Filed: Sep. 6, 2023

(65) Prior Publication Data

US 2025/0076228 A1   Mar. 6, 2025

(51) Int. Cl.
*G01N 23/223* (2006.01)
*G01N 33/28* (2006.01)
*G01N 35/00* (2006.01)
*G01N 35/10* (2006.01)

(52) U.S. Cl.
CPC ....... *G01N 23/223* (2013.01); *G01N 33/2823* (2013.01); *G01N 35/10* (2013.01); *G01N 2035/00465* (2013.01)

(58) Field of Classification Search
CPC .. G01N 23/223; G01N 33/2823; G01N 35/10; G01N 2035/465
See application file for complete search history.

(56) References Cited

U.S. PATENT DOCUMENTS

| | | | | |
|---|---|---|---|---|
| 6,130,931 | A * | 10/2000 | Laurila | G01N 23/223 378/45 |
| 12,110,447 | B1 * | 10/2024 | Ahmed | E21B 41/02 |
| 2003/0101801 | A1 | 6/2003 | Wilson | |
| 2008/0310588 | A1 * | 12/2008 | Cooper | G01N 23/223 378/207 |
| 2010/0272232 | A1 * | 10/2010 | Pesce | G01N 23/223 378/45 |
| 2011/0142200 | A1 * | 6/2011 | Piorek | G01N 23/223 378/45 |
| 2014/0072095 | A1 * | 3/2014 | Feser | G01N 23/223 378/4 |

(Continued)

FOREIGN PATENT DOCUMENTS

EP   1114310 B1   4/2012

OTHER PUBLICATIONS

Gul et al., Automated real-time solids content and salinity analysis of well construction fluids using in-line XRF measurements, Journal of Natural Gas Science and Engineering 2021 vol. 94, 7 pages.

*Primary Examiner* — Blake C Riddick
(74) *Attorney, Agent, or Firm* — Jeffrey D. Frantz

(57) ABSTRACT

A method for estimating an elemental composition of a multiphase oilfield fluid includes obtaining a sample of a multiphase oilfield fluid; blending the sample with a viscosity modifying agent to transform the sample into a high viscosity paste; introducing the high viscosity paste into a chamber of an XRF apparatus; using the XRF apparatus to make an XRF measurement of the high viscosity paste; and evaluating the XRF measurement to estimate an elemental composition of the obtained multiphase oilfield fluid.

20 Claims, 5 Drawing Sheets

(56) References Cited

U.S. PATENT DOCUMENTS

| | | |
|---|---|---|
| 2014/0355737 A1 | 12/2014 | Korkin |
| 2015/0330921 A1* | 11/2015 | Mazor .................. G01N 23/223 |
| | | 378/45 |
| 2017/0160081 A1* | 6/2017 | Pois .................... G01N 23/2273 |
| 2017/0176357 A1* | 6/2017 | Pois ........................ G01B 15/02 |
| 2018/0100290 A1* | 4/2018 | Greer ...................... F15B 11/16 |
| 2018/0100390 A1 | 4/2018 | Patil |
| 2023/0008196 A1 | 1/2023 | Deffenbaugh |
| 2024/0400881 A1* | 12/2024 | Ahmed .................. C09K 8/032 |
| 2025/0075571 A1* | 3/2025 | Troy ....................... E21B 21/06 |

* cited by examiner

XRF MEASUREMENTS OF MULTIPHASE OILFIELD FLUIDS

CROSS REFERENCE TO RELATED APPLICATIONS

None

BACKGROUND

When drilling a well for the production of hydrocarbons, drilling fluid is often circulated through the well for a number of purposes. For example, drilling fluid is commonly intended to provide downhole hydrostatic pressure to counteract the subterranean formation pressure, cool and lubricate the drill bit, flush cuttings away from the drill bit and carry them to the surface through the wellbore annulus, and provide hydraulic power to various downhole tools. Returning drilling fluid is commonly examined at the surface to evaluate its properties and various properties of the formations surrounding the well.

As is known to those of ordinary skill, drilling fluids are highly complex, multi-phase fluids, commonly including at least one liquid phase and one or more solid phase components. The liquid phase may be a viscosified aqueous solution of polymers or clays in brine in water-based drilling fluids (WBM), an emulsion of an aqueous fluid such as brine dispersed in an oil or diesel continuous phase in oil-based drilling fluids (OBM) or in synthetic oil-based drilling fluids (SBM) when the continuous phase is a synthetic oil, or an emulsion of an oil or diesel dispersed in an aqueous fluid such as brine (commonly referred to as a direct emulsion drilling fluid). In use, drilling fluids commonly further include drill cuttings and fine particulate matter from the formations being drilled. Monitoring changes to the drilling fluid composition can be important to predicting the performance of the fluid as well as to understanding the properties of the formations being drilled.

X-Ray Fluorescence (XRF) Spectroscopy is a well-known technique used to measure the elemental composition of a sample. For example, XRF is commonly used in oilfield applications to evaluate drill cutting samples and to determine the elemental composition of the formation rock. XRF measurements have also been proposed for use in evaluating drilling fluids, however, one difficulty in using XRF to evaluate drilling fluids is that drilling fluids commonly settle and undergo phase separation on the time scale of the XRF measurement. This can result in inaccurate and unreliable measurements. There remains a need for improved methods for measuring the elemental composition of in-service drilling fluids.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Embodiments of this disclosure include a method and system estimating an elemental composition of a multiphase oilfield fluid. In one example embodiment, a method includes obtaining a sample of a multiphase oilfield fluid; blending the sample with a viscosity modifying agent to transform the sample into a high viscosity paste; introducing the high viscosity paste into a chamber of an XRF apparatus; using the XRF apparatus to make an XRF measurement of the high viscosity paste; and evaluating the XRF measurement to estimate an elemental composition of the obtained multiphase oilfield fluid.

Figure 1:
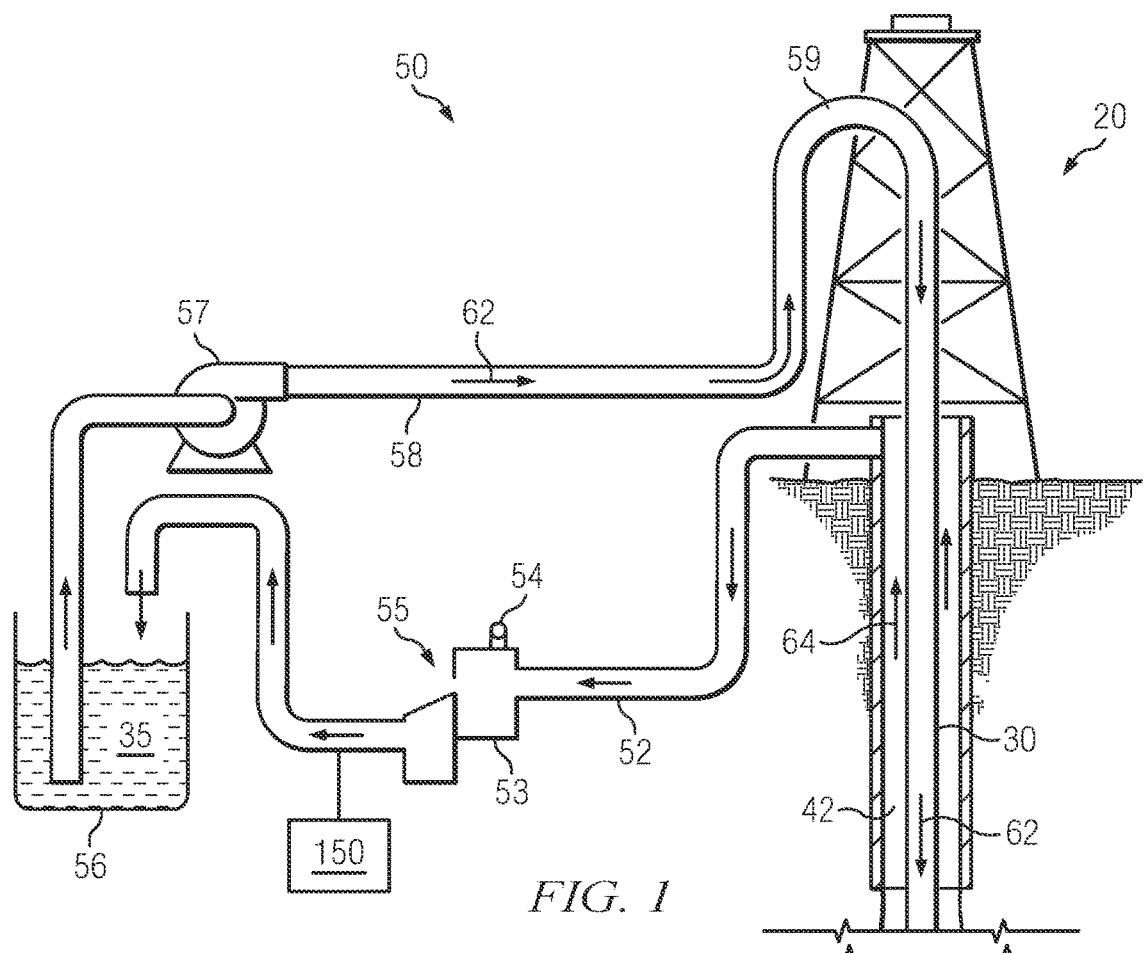
FIG. 1 depicts an example drilling rig including a system for making XRF measurements of drilling fluid in use during the drilling operation.

FIG. 1 depicts an example drilling rig 20 including a system 150 for making XRF measurements of drilling fluid in use during the drilling operation. The drilling rig 20 may be positioned over a subterranean formation (not shown). The rig may include, for example, a derrick and a hoisting apparatus (also not shown) for raising and lowering a drill string 30, which, as shown, extends into wellbore 40 and includes, for example, a drill bit 32 and one or more downhole measurement tools 38 (e.g., a logging while drilling tool or a measurement while drilling tool). Suitable drilling systems, for example, including drilling, steering, logging, and other downhole tools are well known in the art.

Drilling rig 20 further includes a surface system 50 for controlling the flow (or circulation) of drilling fluid 35 used on the rig (e.g., used in drilling the wellbore 40). In the example rig depicted, the drilling fluid 35 is pumped downhole (as depicted at 62) via a conventional mud pump 57. The drilling fluid 35 may be pumped, for example, through a standpipe 58 and mud hose 59 in route to the drill string 30. The drilling fluid 35 typically emerges from the drill string 30 at or near the drill bit 32 (e.g., via drill bit jets) and creates an upward flow 64 of mud through the wellbore annulus 42 (the annular space between the drill string and the wellbore wall). The drilling fluid 35 then flows through a return conduit 52 and solids control equipment 55 (such as a shale shaker) to a mud pit 56 (or mud pit system including multiple mud pits). It will be appreciated that the terms drilling fluid and mud are used synonymously herein.

The circulating drilling fluid 35 is intended to perform many functions while drilling, one of which is to carrying drill cuttings to the surface (in upward flow 64). The cuttings are commonly removed from the returning mud via a shale shaker 55 (or other similar solids control equipment) in the return conduit (e.g., immediately upstream of the mud pits 56). The drilling fluid 35 is generally reused and recirculated downhole. Formation gases that are released during drilling may also migrate to the surface in the circulating drilling fluid. These gasses are commonly removed from the fluid, for example, via a degasser or gas trap 54 located in or near a header tank 53 that is immediately upstream of the shale shaker 55 in the example depiction. The cuttings and gases are commonly examined at the surface to evaluate the formation layers though which the wellbore is drilled.

The drilling rig 20 further includes a system 150 for making XRF measurements on drilling fluid that is in use during the drilling operation. The system 150 may be deployed at substantially any single location or plurality of locations in the surface system 50, for example, along the return conduit 52, between the shale shaker 55 and the mud pit 56 as depicted, in fluid communication with the mud pit 56, or along standpipe 58 or mud hose 59. The disclosed embodiments are not limited in this regard. As described in more detail below with respect to FIGS. 2 and 3, the system 150 may be configured to receive a sample of drilling fluid, prepare the sample for XRF evaluation, and make the XRF measurements on the prepared sample.

While FIG. 1 depicts a land rig 20, it will be appreciated that the disclosed embodiments are equally well suited for land rigs or offshore rigs. As is known to those of ordinary skill, offshore rigs commonly include a platform deployed atop a riser that extends from the sea floor to the surface. The drill string extends downward from the platform, through the riser, and into the wellbore through a blowout preventer (BOP) located on the sea floor. The disclosed embodiments are not limited in these regards.

Figure 2:
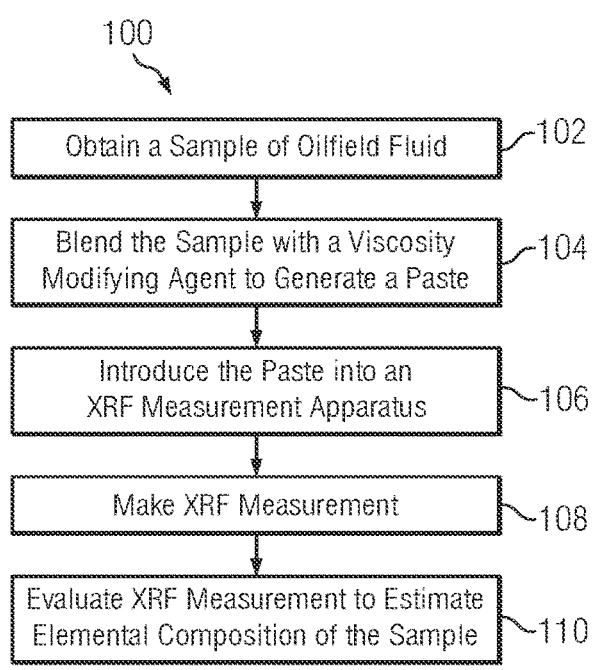
FIG. 2 depicts a flow chart of one example method for estimating the elemental composition of a multiphase drilling fluid in use in a wellbore drilling operation.

FIG. 2 depicts a flow chart of one example method 100 for estimating the elemental composition of a multiphase oilfield fluid in use in a wellbore drilling or completion operation. The method includes receiving (or obtaining) a sample of the oilfield fluid at 102. The sample may include a sample of drilling fluid obtained from substantially any location in the surface system 50, for example, from the return conduit 52, the shale shaker 55, the mud pit 56, standpipe 58, or mud hose 59 (FIG. 1) or an oilfield fluid sample from a high gravity solids (HGS) recovery system or dewatering system as described in more detail below with respect to FIG. 6. The oilfield fluid sample is blended with a viscosity modifying agent including a high surface area powder such as carbon black to transform the sample to a high viscosity paste (or paste-like sample) at 104. The paste (including the fluid sample and the viscosity modifying agent) is then introduced into an XRF measurement apparatus at 106, for example, in a preconfigured sample holder. XRF measurements are made at 108 and evaluated at 110 to estimate the elemental composition of the multiphase fluid. It will be appreciated that estimating the elemental composition of the multiphase fluid does not necessary include determining the amount of each of the elements in the fluid, but may simply include determining whether or not a particular element is present above a detection limit or estimating the amount (or an increasing or decreasing amount from a previous measurement) of one or more elements in the fluid.

With continued reference to FIG. 2, it will be appreciated that blending the drilling fluid sample with the viscosity modifying agent increases the viscosity of the sample significantly, thereby preventing (or significantly delaying or slowing) phase separation and settling of the high-density components in the fluid. It will be appreciated that settling of solids in a multi-phase fluid is a kinetic process and that adding the viscosity modifying agent is intended to reduce the settling rate (or velocity) of the solids. Reducing the settling velocity may be achieved, for example, via increasing the viscosity of the fluid at low shear rates and/or by providing the fluid with a large yield stress. In example embodiments, a viscosity of greater than about 100 P, or 10 Pa s at low shear rates such as $1 \text{ s}^{-1}$, may be sufficient to prevent settling in the drilling fluid in the time frame required to obtain an XRF measurement (e.g., greater than about 200 P, greater than about 500 P, or greater than about 1000 P). In terms of yield stress, a yield stress of greater than about 10 Pa may be sufficient to prevent settling in the drilling fluid in the time frame required to obtain an XRF measurement (e.g., greater than about 20 Pa, greater than about 50 Pa, or greater than about 100 Pa).

In advantageous embodiments, a sufficient quantity of a high surface area powder is added to the sample so as to transform the sample into a paste. The quantity of powder added to the drilling fluid sample generally depends on the mass (or volume) of the sample, the type of fluid, and the type of powder used. In example embodiments in which the high surface area powder is carbon black, the quantity of the powder may range from a weight ratio of 10 parts powder to 1 part oilfield fluid (10:1) to a weight ratio of 1 part powder to about 100 parts oilfield fluid (1:100). For example, in some applications, it may be advantageous to provide a high dilution factor for evaluating highly concentrated elements or elements that have partially overlapping peaks. In such embodiments, a weight ratio in a range from about 10 parts powder to 1 part oilfield fluid (10:1) to about 1 part powder to about 1 part oilfield fluid (1:1) may be advantageous. In other example applications, it may be advantageous to use as little of the powder as possible to obtain a paste having a sufficiently high viscosity so as to not overly dilute the original oilfield fluid sample. In such embodiments, a weight ratio in a range from about 1 part powder to about 1 part oilfield fluid (1:1) to a about 1 part powder to about 100 parts oilfield fluid (1:100) may be advantageous (e.g., from about 1:2 to about 1:50, from about 1:3 to about 1:19, or from about 1:3 to about 1:9). In still other example applications, for example, in which the oilfield fluid has a high initial viscosity, a weight ratio in a range from about 1 part powder to about 20 parts oilfield fluid (1:20) to a about 1 part powder to about 100 parts oilfield fluid (1:100) may be advantageous. It will, of course, be understood that the oilfield fluid and viscosity modifying agent may be mixed volumetrically. One of ordinary skill in the art will be readily able to convert weight ratios to volumetric ratios or volumetric ratios to weight ratios based on the densities of the oilfield fluid and the viscosity modifying agent.

The viscosity modifying agent may include substantially any suitable powder, for example, including carbon black, fumed silica, alumina, and other powders. Carbon black, particularly high surface area carbon black, may be advantageously utilized since small amounts of carbon black can significantly increase the sample viscosity and promote paste formation. Moreover, carbon black (being essentially entirely carbon) is advantageously undetectable to the XRF measurements and therefore does not influence the estimated elemental composition of the drilling fluid. Of course, it will be understood that carbon black may include trace impurities. These impurities may be ignored in some operations. In other operations it may be advantageous to measure an XRF spectrum of carbon black and subtract (or otherwise account for) any impurities in the subsequent spectra obtained from the paste samples.

It will be appreciated that substantially any suitable carbon black may be utilized, for example, having a surface area in a range from about 80 $\text{m}^2/\text{g}$ to about 1000 $\text{m}^2/\text{g}$.

While higher surface area carbon blacks may be advantageous in that less of the carbon black is required to achieve a high viscosity paste, the disclosed embodiments are explicitly not limited in this regard.

With still further reference to FIG. 2, advantageous embodiments of method 100 may be automated or semi-automated. For example, a drilling fluid sample may be automatically pumped from one of the flow lines or from the mud pit (FIG. 1) to a blender (mixer). The carbon black (or other powder) may be automatically metered into the blender either before or after the drilling fluid sample is received and then automatically blended with the powder. After blending, the high viscosity paste may be automatically injected (or otherwise transferred) into a sample cup (or holder), which may in turn be automatically transferred to the XRF chamber for measurement. The XRF measurement may be automatically or manually triggered and the corresponding spectrum (or spectra) saved and evaluated on a computer.

It will be appreciated that estimating the composition of the oilfield (e.g., drilling) fluid may enable the composition of the fluid to be adjusted (or other drilling parameters to be adjusted). For example, simultaneously increasing amounts of potassium, aluminum, silicon, and possibly thorium, and/or uranium in a drilling fluid may indicate an increasing clay concentration or a high and/or increasing clay index. In response an automated (or manual) order may be generated to increase the quantity of shale inhibitor and encapsulator in the drilling fluid. An order may also be generated to increase the drilling fluid flow rate and/or to reduce the weight on bit. Decreasing barium levels may indicate a loss of HGS during the drilling operation. A driller may opt to add additional barite to the drilling fluid or to investigate the loss and evaluate other remedial actions. Moreover, increasing amounts of sodium and chlorine may indicate that the wellbore is entering a salt formation. Additives appropriate for drilling in a salt formation may be added to the drilling fluid.

Figure 3:
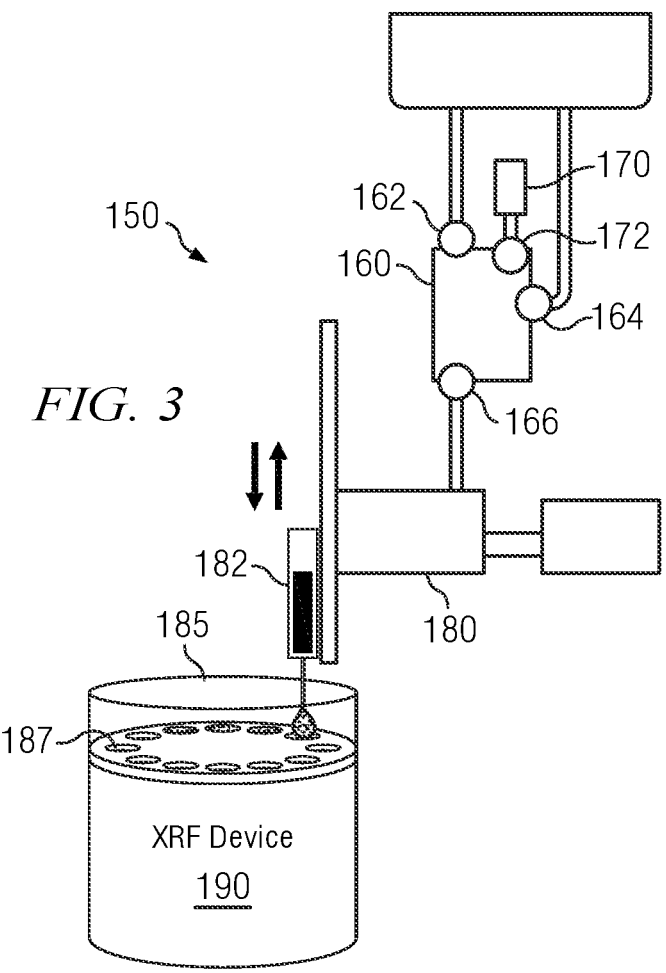
FIG. 3 depicts one example embodiment of an XRF measurement system for making XRF measurements on drilling fluid that is in use during the drilling operation.

FIG. 3 depicts one example embodiment of a system 150 for making XRF measurements on an oilfield fluid that is in use during a drilling operation. In the depicted embodiment, a mixer (or blender) 160 is in fluid communication with mud pit, a tank, or a fluid flow line, for example, including return conduit 52, standpipe 58, mud hose 59, or the flow line between the shale shaker 55 and the mud pit 56 (FIG. 1). The blender 160 is in further fluid communication with a carbon black (or other high surface area powder) tank 170 and an XRF sample dispenser 180. A sample of drilling fluid may be drawn or received into the blender 160 by opening valve 162 and closing valve 164. Carbon black may be added to the blender 160 from the carbon black tank by opening a metering element 172, including, for example, a valve, an auger, an Archimedes screw, an extruder, a twin extruder, a solid shaker, or any other solid powder metering device.

The blender may be configured to shear the contents thereof and thereby transform the carbon black drilling fluid sample mixture into a high viscosity fluid or paste. The resulting paste may be transferred to the sample dispenser 180 by opening valve 166. The dispenser may include a motorized syringe 182 configured to dispense a predetermined volume of the paste into sample holder 185. The sample holder may include a plurality of sample cups 187, arranged, for example, in a circular carousel. The individual samples may be rotated (one by one) through the XRF apparatus 190 to obtain corresponding XRF measurements of the samples. It will, of course, be appreciated that the system 150 (or portions thereof) may be rinsed, for example, using a base oil to avoid cross contamination between measurements.

With continued reference to FIG. 3, the XRF instrument 190 may include substantially any suitable XRF device, for example, including a portable device such as the Epsilon 1 available from Malvern® Instruments. In example embodiments, the XRF instrument 190 may include a vacuum pump and vacuum sample chamber for making XRF measurements under vacuum (or low pressure), an X-ray tube, a Si-drift detector, corresponding electronics, and a temperature controller for controlling the temperature of the sample chamber. The XRF instrument 190 may be integrated with the sample carousel for making automated or semi-automated measurements.

With continued reference to FIGS. 2 and 3, it will be appreciated that transforming the oilfield fluid into a paste as described above may confer multiple advantages. For example, transforming the fluid into a paste may enable the XRF measurements to be performed under vacuum (or very low pressure) where the light elements such as sodium (Na) and magnesium (Mg) may be measured more accurately. Moreover, transforming the fluid into a paste may enable longer measurement times to be employed (since pastes do not settle or otherwise separate), thereby improving the signal to noise ratio of the measurement and the corresponding accuracy of the elemental determination (particularly for trace element detection and quantification such as for nickel, chromium, cobalt, thorium, and/or uranium). Transforming the drilling fluid into a paste may further enable robust and customized calibration procedures to be developed and utilized.

Figure 4A:
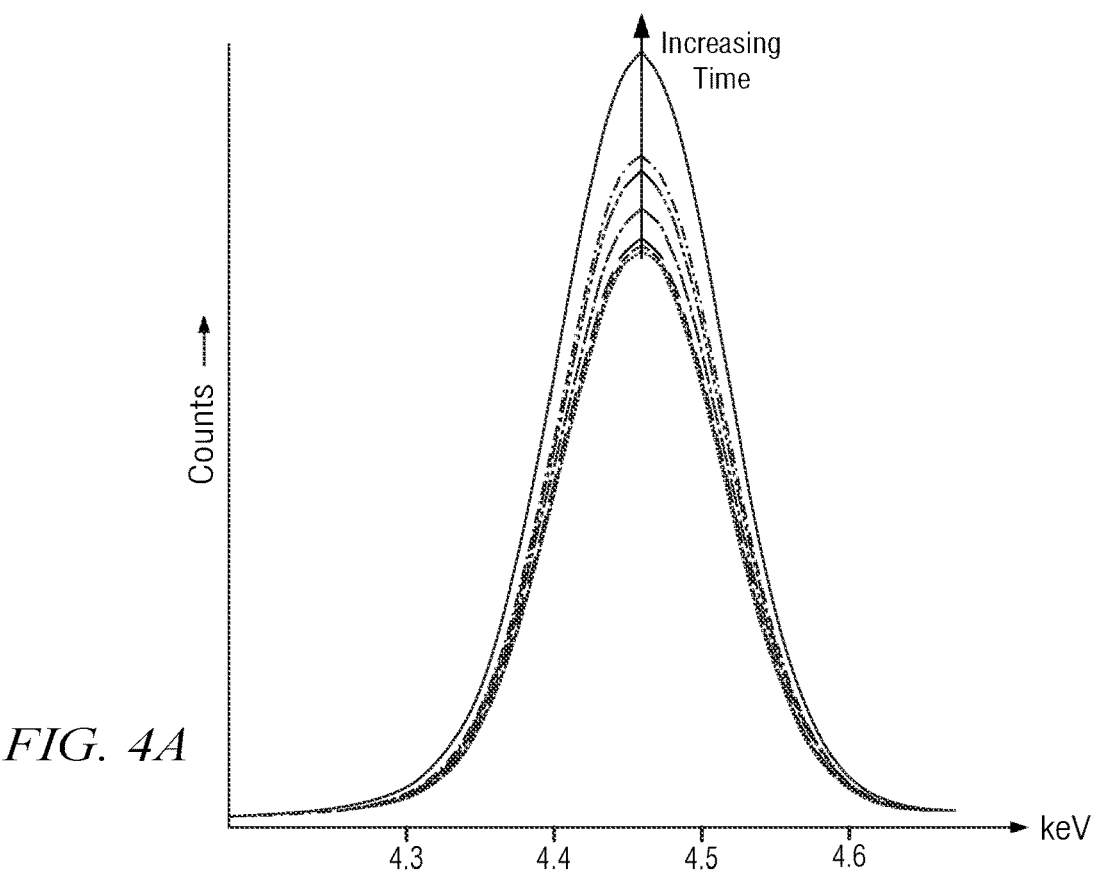
FIGS. 4A and 4B (collectively FIG. 4) depict portions of measured XRF spectra (XRF measurements) obtained from a drilling fluid sample (4A) and from a paste sample (4B) obtained my blending the drilling fluid sample with carbon black.
Figure 4B:
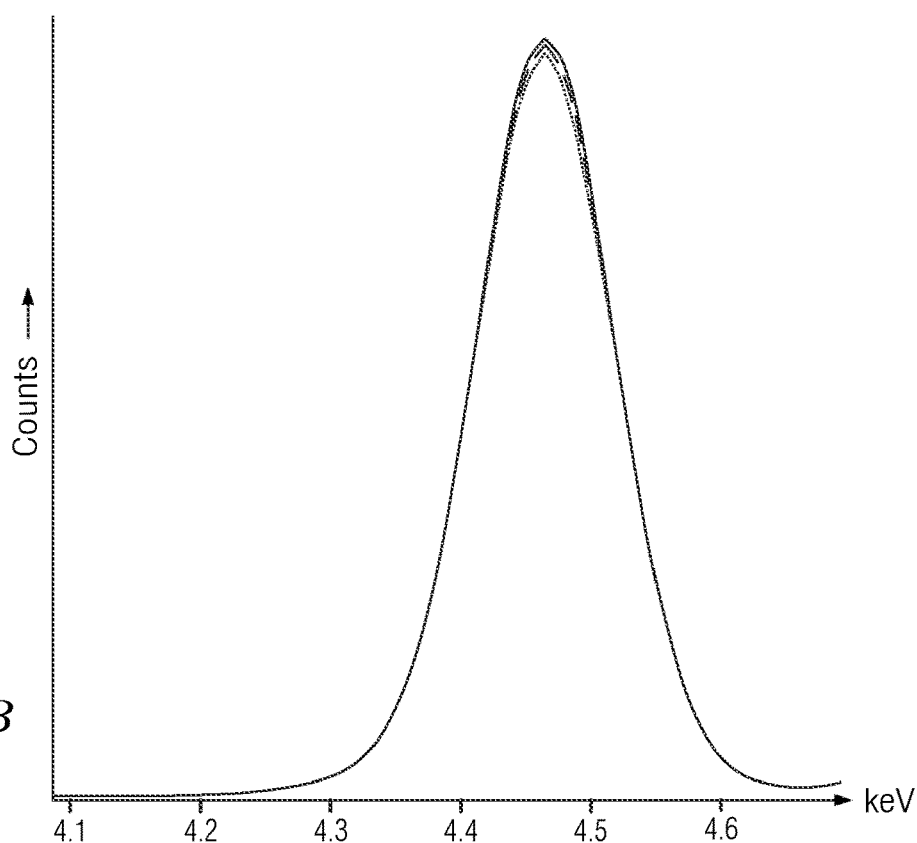

FIGS. 4A and 4B (collectively FIG. 4) depict portions of measured XRF spectra (XRF measurements) obtained from a drilling fluid sample (4A) and from a paste sample (4B) obtained by blending the drilling fluid sample with carbon black as described above. The drilling fluid sample was a water-based drilling fluid including 40 weight percent barite. The sample was mixed to maintain an even distribution of barite in the fluid. The sample was then transferred to a cup and XRF spectra were obtained at time zero, seven minutes, 14 minutes, 21 minutes, 60 minutes, 67 minutes, and 120 minutes after transferring the sample to the cup. The barium Lal peak is shown for each of these spectra in FIG. 4A. Note that the barium peak height increases significantly with time indicating settling of the barite at the bottom of the sample cup.

The paste sample was prepared by combining 4 parts by weight of the drilling fluid with one part by weight carbon black to form the paste. XRF spectra were obtained for the paste sample at an initial time, that one day, and that two days. The barium Lal peak is shown for each of these spectra in FIG. 4B. Note that the barium peak is highly stable with time indicating that the drilling fluid has been stabilized in the paste sample.

Figure 5:
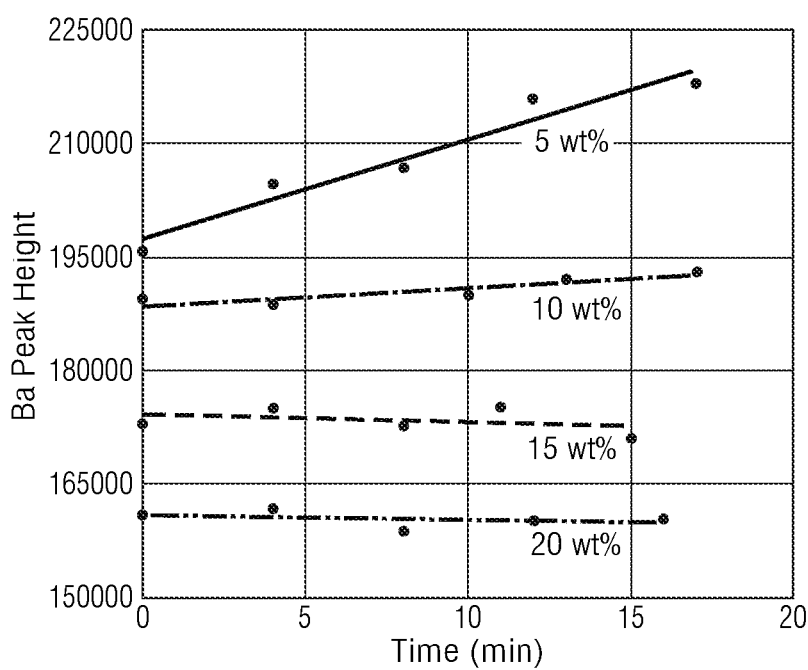
FIG. 5 depicts a plot of the barium peak height versus time (in units of minutes) for four viscosity enhanced drilling fluids.

FIG. 5 depicts a plot of the barium peak height versus time (in units of minutes) for four different paste samples. In this example demonstration, each of the four paste samples included a barite containing water-based drilling fluid having a density of 14 pounds per gallon (1.68 g/cm$^3$) (HydraGlyde® available from Schlumberger) blended with carbon black. The blended samples included 5 wt. %, 10 wt. %, 15 wt. %, and 20 wt. % of the carbon black (weight ratios of 1:19, 1:9, 1:5.7, and 1:4). The viscosity of the blended samples increased significantly with increasing carbon black. The third and fourth samples (including 15 wt. % and 20 wt. % of the carbon black) were thick and paste-like (having very high viscosities). These samples exhibited stable (constant) barium peak heights out to at least 15 minutes indicating that there was no settling of the barite particles. The second sample (including 10 wt. % of the carbon black) was a highly viscous liquid and exhibited nearly constant barium peak heights (the peak height was observed to increase about 1-2 percent (about 300 counts) in 17 minutes. The first sample (including 5 wt. % of the carbon black) was a moderately viscous liquid and exhibited an unstable barium peak height (indicating settling of the barite in the drilling fluid). The barium peak height was observed to increase about 135 counts per minute from about 19500 to about 21800 counts in 17 minutes (an increase of nearly 12 percent). Based on the foregoing it is evident that blending carbon black with a drilling fluid sample to form a paste can significantly improve the stability of the XRF measurements.

Figure 6A:
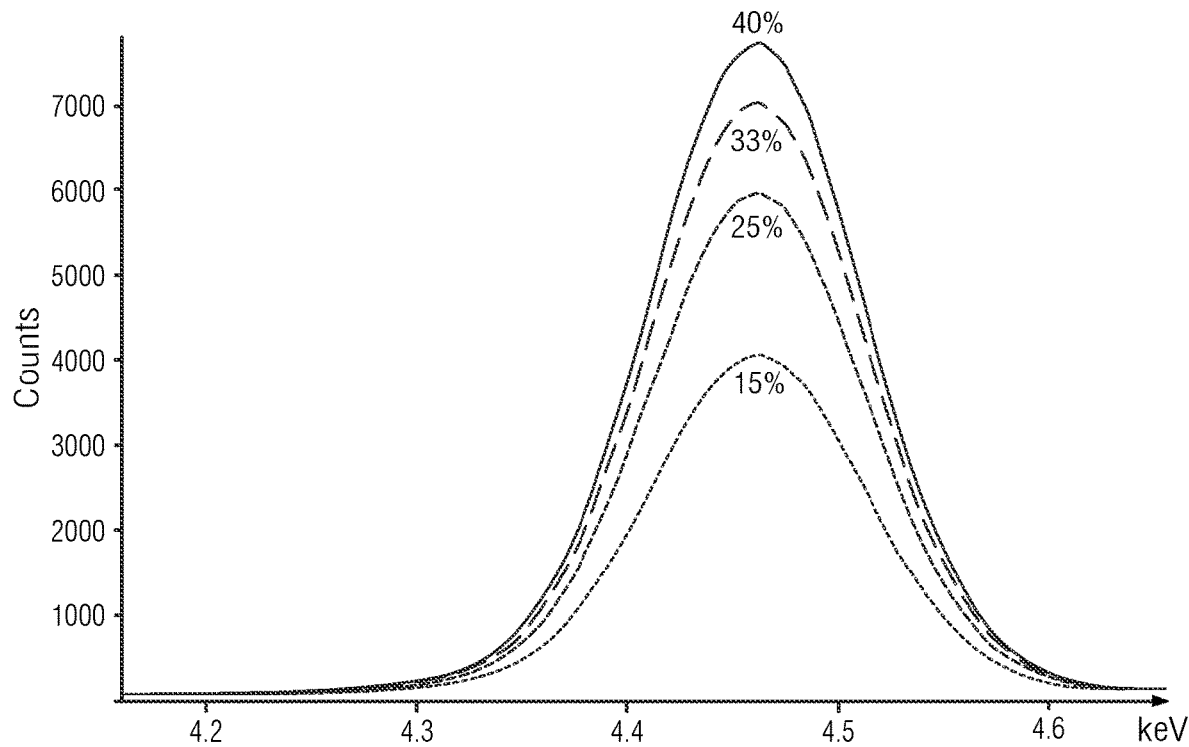
FIGS. 6A and 6B (collectively FIG. 6) depict portions of measured XRF spectra (XRF measurements) obtained from paste samples including drilling fluids and carbon black mixtures showing barium peaks (6A) and silicon peaks (6B).
Figure 6B:
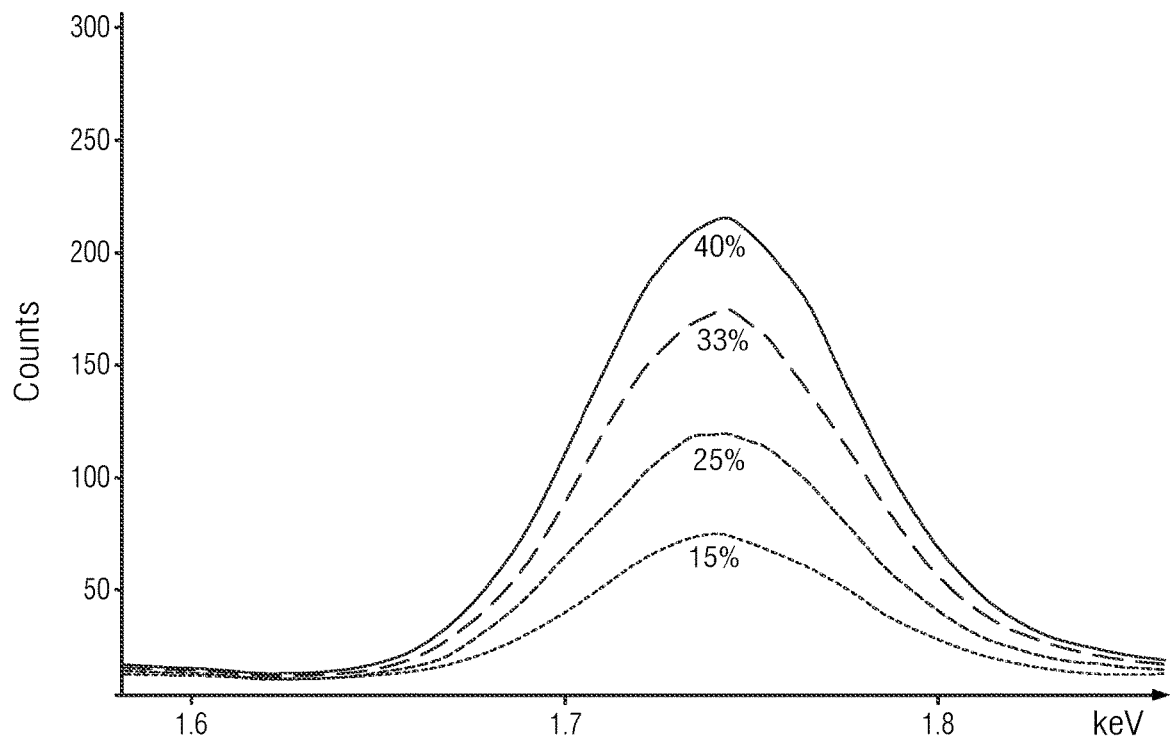

FIGS. 6A and 6B (collectively FIG. 6) depict portions of measured XRF spectra (XRF measurements) obtained from paste samples including drilling fluids and carbon black mixtures. Each paste sample was prepared by combining 9 parts by weight of drilling fluid with one part by weight carbon black to form the paste. To obtain the spectra depicted on FIG. 6A, four water based drilling fluids were prepared including 15, 25, 33, and 40 weight percent barite, respectively. Corresponding paste samples were prepared and evaluated to obtain the depicted XRF spectra. Note that as expected the peak height of the barium Lal peak increased with the increasing amount of barite in the drilling fluid.

To obtain the spectra depicted on FIG. 6B, four water based drilling fluids were prepared including 15, 25, 33, and 40 weight percent American Petroleum Institute (API) clay, respectively. Corresponding paste samples were prepared (by combining 9 parts by weight of drilling fluid with one part by weight carbon black) and evaluated to obtain the depicted XRF spectra. Note that as expected the peak height of the silicon Kal peak increases with an increasing amount of barite in the drilling fluid.

As indicated in FIGS. 5 and 6, the elemental (e.g., barium or silicon) peak height depends on both the concentration of the element in the drilling fluid and on the relative amount of carbon black used to form the paste (the peak height generally increases with an increasing amount of the element in the drilling fluid and generally decreases with an increasing amount of carbon black in the paste). As further indicated in FIGS. 4 and 5, the measured elemental peak height is stable with time for pastes including a sufficient quantity of carbon black (e.g., having a sufficiently high viscosity to prevent settling). It will be appreciated that reliable calibrations may be advantageously obtained for such paste samples. For example, the calibration may be obtained by evaluating a number of paste samples having known concentrations of various drilling fluid components (known elemental concentrations) and developing correlations between the observed peak heights (or areas under the peaks) and the known concentrations. Such calibrations may include Compton peak normalization or Compton/Rayleigh peak ratios as is known to those of ordinary skill. The disclosed embodiments are not limited to any particular calibration or calibration methodology.

It will be appreciated that the disclosed embodiments are expressly not limited to evaluating drilling fluids, but can be applied to substantially any multiphase oilfield fluid, for example, including drilling fluid, reservoir drill-in fluid, completion fluid, produced water, and recycled or wastewater and fluids. In such example applications, a sample of the multiphase oilfield fluid is first blended with a viscosity modifying powder such as carbon black to transform the multiphase fluid into a paste (e.g., as described above with respect to FIG. 2). The paste is then evaluated with an XRF instrument to estimate the elemental composition of the multiphase fluid (of the whole fluid including the multiple phases thereof).

Figure 7:
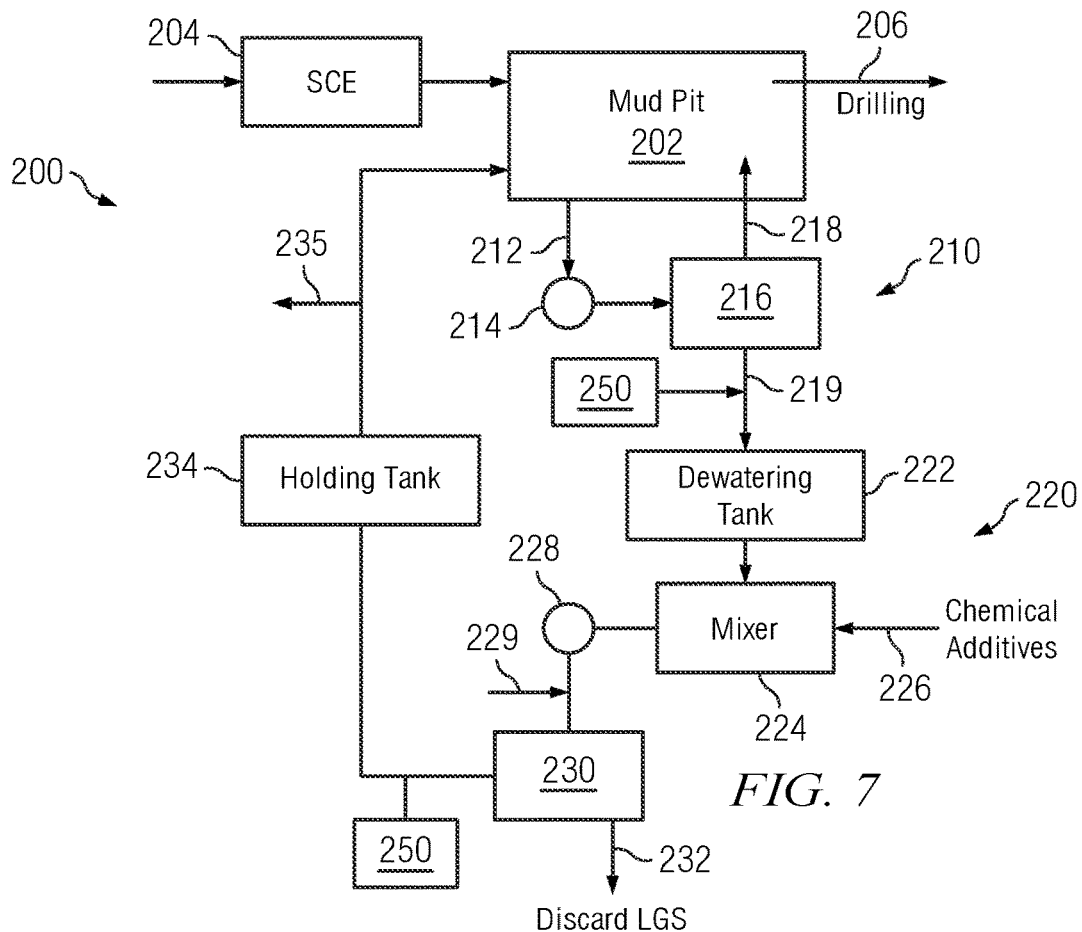
FIG. 7 depicts a process diagram for an example dewatering process including high gravity solids recovery and low gravity solids removal for an example drilling fluid.

FIG. 7 depicts a process diagram 200 for an example of a drilling fluid (e.g., WBM) dewatering process including high density solids (HSG) (e.g., primarily large particles and high-density solids such as barite) recovery and low gravity solids (LGS) (e.g., primarily very small particles and low-density solids such as silica and clays) removal for an example drilling fluid. In the depicted example, drilling fluid flows into a mud pit 202 (or mud pit system) from solids control equipment 204 (e.g., a shale shaker) where it may be adjusted or modified prior to being pumped downhole at 206. Drilling fluid is received from the mud pit 202 into an HSG recovery system 210, for example, via flow line 212 and pump 214 (e.g., a centrifugal pump). The received drilling fluid is pumped through an HGS recovery centrifuge 216 which is configured to remove a portion of the HGS (e.g., barite) from the drilling fluid and return the recovered HSG (the centrifugate) to the mud pit as depicted at 218. The supernatant 219 (also referred to herein as a dewatering fluid) may be transferred to a dewatering system 220 (which may or may not include a storage tank 222). In the case where a storage tank is not available, a pipe connecting the centrifuge 216 to the dewatering system 220 is used to transfer the supernatant 219. As described in more detail below, the HSG recovery system 210 may optionally include one or more XRF measurement systems 250.

As used herein the term high gravity solids (HGS) refers to dense solids, such as barite, calcium carbonate, and/or hematite, that are added to the drilling fluid to increase the density thereof. HGS are also commonly referred to in the art as weighting material and often have a density exceeding 4 g/cm$^3$. As used herein the term low gravity solids (LGS) refers to dispersed lower density solids not trapped in the solids control shakers such as finely ground, drill cuttings and or added clay (e.g., bentonite clay). It will be appreciated by those of ordinary skill in the art that the HSG recovery system 210 may be configured to remove HSG from the drilling fluid (in the centrifugate), while leaving the LGS in the supernatant. For example, the flow rate of the drilling fluid and the rotation rate of the centrifuge may be adjusted (optimized) such that the centrifuge removes primarily (or mostly) HSG. Therefore, in many operations, drilling fluid in the dewatering storage tank 222 generally includes LSG (and a small amount of HSG).

Drilling fluid in the storage tank 222 may be transferred to mixer 224 (e.g., a static mixer or blender). Water and one or more chemical additives in aqueous solutions, such as a coagulant and/or an acid may be added to the mixer as depicted at 226. After mixing in the additive(s), the drilling fluid may be pumped 228 through a dewatering centrifuge 230 that is configured to concentrate and remove the LGS (and any remaining HGS) at 232. As depicted, one or more polymer additives 229 (flocculants dissolved in water) may be injected into the drilling fluid prior to centrifugation, often with some pipe or tank residence time to allow them residence time to increase their effectiveness and enhance the particle agglomeration/flocculation and the separation in the centrifuge. The supernatant from centrifuge 230 (also referred to as clean centrate) may then be transferred to holding tank 234, where it may be optionally further treated, diluted, etc. prior to recycling back into the mud pit 202, or may be considered as an excess, and disposed from the process 235. As also described in more detail below, the dewatering system 220 may optionally include one or more XRF measurement systems 250.

With continued reference to FIG. 6, fluid samples may be obtained at substantially any suitable locations in the HGS recovery system 210 and/or the dewatering system 220, blended with a high surface area powder such as carbon black to transform the sample to a high viscosity paste and evaluated using XRF as described above with respect FIG. 2. In example embodiments, a fluid sample may be obtained from the supernatant of the HGS recovery centrifuge 216 (a dewatering fluid sample). The acquired XRF spectra may then be evaluated, for example, for the presence of barium, manganese, iron, or calcium to indicate the amount of HGS (e.g., barite, hematite, manganese oxide, or in some cases calcium carbonate, or calcium/magnesium carbonate, or any other high specific gravity solids that could be used in the drilling fluid) remaining in the supernatant (e.g., to determine the effectiveness of the HGS recovery operation). It will be understood that high concentrations of HGS in the supernatant may indicate an inefficient HGS recovery operation while low concentrations of HGS in the supernatant may indicate an efficient HGS recovery operation. Moreover, it will further be appreciated that the drilling fluid flow rate through the centrifuge and the rotation rate of the centrifuge may be adjusted in response to the XRF measurements.

In other example embodiments, a fluid sample (or another fluid sample) may be obtained from the supernatant of the dewatering centrifuge 230 (a clean centrate fluid sample). The acquired XRF spectra may then be evaluated, for example, for the presence of calcium, magnesium, silicon, aluminum, thorium, uranium, etc. to indicate the amount of LGS (e.g., formation minerals, silica, feldspard and clay) remaining in the supernatant (e.g., to determine the effectiveness of the LGS removal operation). It will be understood that high concentrations of LGS in the supernatant may indicate an inefficient dewatering operation while low concentrations of LGS in the supernatant may indicate an efficient dewatering operation. Moreover, it will further be appreciated that the drilling fluid flow rate through the centrifuge, the rotation rate of the centrifuge, and the mass of chemical additives (e.g., flocculant or coagulant) added to the mixer may be adjusted in response to the XRF measurements.

With still further reference to FIG. 7, the XRF measurements may be evaluated for the presence of the coagulant in the supernatant. In some dewatering operations, the coagulant may include aluminum sulfate or aluminum chloride or aluminum polychloride. In such operations it may be undesirable to recycle aluminum into the mud pit, as this could cause deleterious effects to the drilling mud viscosity. XRF measurements of the supernatant from the dewatering centrifuge 230 may be evaluated for the presence of aluminum in the stream, and the measurement be used to control the amount of coagulant and flocculant added to the mixer. Those of skill in the art will appreciate that selecting the appropriate level of aluminum carryover implies a balance between the amount of LGS solids returned to the pit, and the extend of the removal of solids and other drilling mud chemicals through the coagulation and flocculation process, which is best optimized for each drilling fluids, operation and rig, as needed.

As noted above, drilling fluid samples may be obtained at substantially any suitable locations in the HGS recovery system 210 and/or the dewatering system 220. Other suitable locations may include, for example, the inputs to and the centrifugate outputs from the HGS recovery centrifuge 216 and the dewatering centrifuge 230 as well as the return line to the mud pit 202. It will be appreciated that acquiring drilling fluid samples from each of the inputs to and centrifugate and supernatant outputs from the centrifuges 216, 230 may advantageously enable a mass balance to be determined (estimated) for each centrifuge. Such a mass balance may determine the effectiveness of the centrifuge at removing the HGS and LGS from the drilling fluid.

Figure 8:
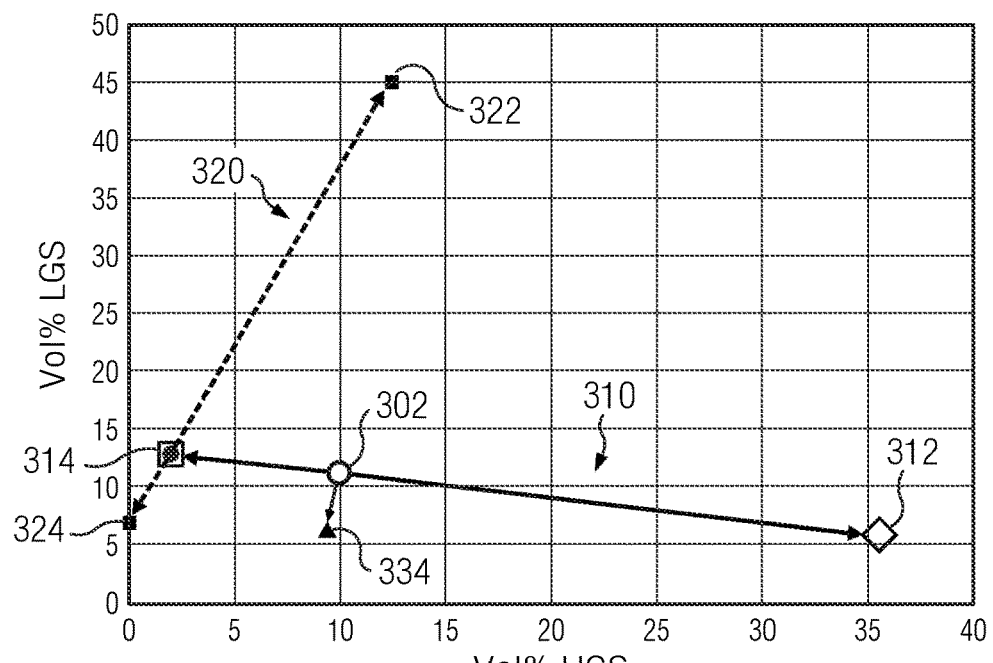
FIG. 8 depicts a plot of a volume percent of LGS on the vertical axis versus a volume percentage of HGS on the horizontal axis for an example dewatering operation.

FIG. 8 depicts a plot of a volume percent of LGS on the vertical axis versus a volume percentage of HGS on the horizontal axis for an example dewatering operation. The original drilling fluid from the mud tank is shown at 302. As shown at 310, the HGS recovery centrifuge 216 separates the original drilling fluid into a centrifugate 312 including a high percentage of HGS and a supernatant 314 including a low percentage of HGS. As described above, the centrifugate 312 may be recovered (returned to the mud pit) while the supernatant is transferred to the dewatering system 220. As shown at 320, the dewatering centrifuge 230 separates fluid 314 into a centrifugate 322 including a high percentage of LGS and a supernatant 324 including a low percentage of LGS and HGS. As described above, the supernatant 324 may be recovered while the centrifugate (including the LGS) is discarded. The combination of the recovered centrifugate 312 and the supernatant 324 is shown at 334 and includes a 50 percent reduction in LGS (12 volume percent to 6 volume percent) at the expense of a 5% reduction in HGS (10 volume percent to 9.5 volume percent).

With further reference to FIG. 7, it will be appreciated that the XRF measurements may be made automatically or semi-automatically, for example, as described above with respect to FIGS. 2 and 3. In such embodiments, XRF measurement systems 250 may be similar (or even substantially identical) to XRF measurement system 150 depicted on FIG. 3.

Moreover, such automated or semi-automated XRF measurements may be used to automate or semi-automate the HGS solids recovery and dewatering processes depicted on FIG. 7. In one example embodiment in which XRF measurements are made on the supernatant of the HGS recovery centrifuge, the peak height or peak area of a predetermined peak (or peaks) in the XRF spectra may be automatically evaluated and used to control the drilling fluid flow rate into the centrifuge and/or the rotation rate of the centrifuge. For example, when the XRF spectra indicate that the quantity of HGS solids is above a threshold, the rotation rate of the centrifuge may be increased or the flow rate of drilling fluid into the centrifuge may be decreased to improve the efficiency of centrifuge.

In another example embodiment in which XRF measurements are made on the supernatant of the dewatering centrifuge, the peak height or peak area of a predetermined peak (or peaks) in the XRF spectra may be automatically evaluated and used to control the drilling fluid flow rate into the centrifuge and/or the rotation rate of the centrifuge. For example, when the XRF spectra indicate that the quantity of LGS solids is above a threshold, the rotation rate of the centrifuge may be increased or the flow rate of drilling fluid into the centrifuge may be decreased to improve the efficiency of centrifuge. Or when the XRF spectra indicate that the quantity of aluminum is above a threshold, the amount of coagulant added to the mixer may be reduced, and or the amount of flocculant may be increased. It will, of course, be appreciated that the disclosed embodiments are not limited to these example automated implementations.

While FIG. 7 depicts a dewatering process for WBM, it will be understood that a similar process may be employed for oil based inverse emulsion drilling fluids in which the supernatant streams obtained in the centrifuges are brine in oil emulsions. Moreover, a similar process may be employed for direct emulsion drilling fluids in which the supernatant streams obtained in the centrifuges are oil in water emulsions. The control of HGS and LGS may be optimized into each of the streams by performing chemical compositional XRF analysis of the different streams using the sample preparation and analysis methodologies described herein.

It will be understood that the present disclosure includes numerous embodiments. These embodiments include, but are not limited to, the following embodiments.

In a first embodiment, a method for estimating an elemental composition of a multiphase oilfield fluid includes obtaining a sample of a multiphase oilfield fluid; blending the sample with a viscosity modifying agent to transform the sample into a high viscosity paste; introducing the high viscosity paste into a chamber of an x-ray fluorescence (XRF) apparatus; using the XRF apparatus to make an XRF measurement of the high viscosity paste; and evaluating the XRF measurement to estimate an elemental composition of the obtained multiphase oilfield fluid.

A second embodiment may include the first embodiment, wherein the obtained sample comprises a sample of drilling fluid used in a wellbore drilling operation.

A third embodiment may include the second embodiment, further comprising adjusting an actual composition of drilling fluid in a mud pit in response to the estimated elemental composition.

A fourth embodiment may include any one of the first through third embodiments, wherein the viscosity modifying agent comprises carbon black.

A fifth embodiments may include any one of the first through fourth embodiments, wherein the sample of the multiphase oilfield fluid is automatically obtained from a flow line, a mud pit, or a tank; the obtained sample is automatically blended with the viscosity modifying agent to transform the obtained sample into the high viscosity paste; and the high viscosity paste is automatically dispensed into a sample cup and transferred to the chamber of the XRF apparatus for making the XRF measurement.

A sixth embodiment may include any one of the first through fifth embodiments, wherein the evaluating the XRF measurement further comprises: developing a correlation between a peak height or an area under a peak in the XRF measurement and a concentration of an element in the multiphase oilfield fluid; and evaluating the peak height or the area under a peak in the XRF measurement with the correlation to estimate the elemental composition of the multiphase oilfield fluid.

A seventh embodiment may include any one of the first through sixth embodiments, wherein the multiphase oilfield fluid is a dewatering fluid obtained from a of high gravity solids (HGS) recovery system in a drilling fluid dewatering process; and the evaluating the XRF measurement further comprises evaluating the XRF measurement for at least one of barium, manganese, iron, or calcium to estimate an amount of HGS in the dewatering fluid.

An eighth embodiments may include the seventh embodiment, further comprising adjusting an operational parameter of the HGS recovery system in response to the estimated amount of HGS in the dewatering fluid.

A ninth embodiment may include any one of the first through eighth embodiments, wherein the multiphase oilfield fluid is a clean centrate fluid obtained from a low gravity solids (LGS) removal system in a drilling fluid dewatering process; and the evaluating the XRF measurement further comprises evaluating the XRF measurement for at least one of calcium, magnesium, silicon, aluminum, thorium, or uranium to estimate an amount of LGS in the clean centrate fluid.

A tenth embodiment may include the ninth embodiment, further comprising adjusting an operational parameter of the LGS removal system in response to the estimated amount of LGS in the clean centrate fluid.

In an eleventh embodiment a system for estimating an elemental composition of a multiphase oilfield fluid includes a fluid input port configured for receiving a sample of the multiphase oilfield fluid; a mixer configured to mix the received sample with carbon black to transform the received sample to a high viscosity paste; an x-ray fluorescence (XRF) sample holder configured to receive the high viscosity paste; an XRF measurement tool configured to make an XRF measurement of the high viscosity paste; and a processor configured to evaluate the XRF measurement to estimate an elemental composition of the multiphase oilfield fluid.

A twelfth embodiment may include the eleventh embodiment, further comprising a carbon black containing vessel configured to transfer the carbon black to the mixer.

A thirteenth embodiment may include any one of the eleventh through twelfth embodiments, further comprising a paste dispenser configured to transfer the high viscosity paste to the sample holder; and a carrousel including a plurality of the sample holders.

A fourteenth embodiment may include the thirteenth embodiment, wherein the mixer is configured to automatically receive the sample of the multiphase oilfield fluid and the carbon black and to automatically blend the received sample and the received carbon black to transform the received sample into the high viscosity paste; and the paste dispenser is configured to automatically transfer the high viscosity paste to the sample holder.

A fifteenth embodiment may include any one of the eleventh through fourteenth embodiments, wherein the processor comprises a correlation between a peak height or an area under a peak in the XRF measurement and a concentration of an element in the multiphase oilfield fluid; and the processor is further configured to evaluate the peak height or the area under a peak in the XRF measurement with the correlation to estimate the elemental composition of the multiphase oilfield fluid.

In a sixteenth embodiment a method for evaluating a multiphase dewatering fluid includes obtaining a sample of the multiphase dewatering fluid from a high gravity solids (HGS) recovery system or a low gravity solids (LGS) removal system in a dewatering process; blending the obtained sample with carbon black to transform the obtained sample into a paste; and making an XRF measurement of the paste to estimate an elemental composition of the dewatering fluid.

A seventeenth embodiment may include the sixteenth embodiment, wherein the multiphase dewatering fluid is obtained from the HGS recovery system; and the making the XRF measurement further comprises evaluating the XRF measurement for at least one of barium, manganese, iron, or calcium to estimate an amount of HGS in the multiphase dewatering fluid.

An eighteenth embodiment may include the seventeenth embodiment, further comprising adjusting an operational parameter of a centrifuge in the HGS recovery system in response to the estimated amount of HGS in the dewatering fluid.

A nineteenth embodiment may include any one of the sixteenth through eighteenth embodiments, wherein the multiphase dewatering fluid is obtained from the LGS removal system; and the making the XRF measurement further comprises evaluating the XRF measurement for at least one of calcium, magnesium, silicon, aluminum, thorium, or uranium to estimate an amount of LGS in the multiphase dewatering fluid.

A twentieth embodiment may include the nineteenth embodiment, further comprising adjusting an operational parameter of a centrifuge in the LGS removal system in response to the estimated amount of LGS in the multiphase dewatering fluid.

Although XRF measurements of multiphase oil-field fluids have been described in detail, it should be understood that various changes, substitutions and alternations can be made herein without departing from the spirit and scope of the disclosure as defined by the appended claims.

What is claimed is:

1. A method for estimating an elemental composition of a multiphase oilfield fluid, the method comprising:
   obtaining a sample of the multiphase oilfield fluid;
   blending the sample with a viscosity modifying agent to transform the sample into a higher viscosity paste;
   introducing the higher viscosity paste into a chamber of an x-ray fluorescence (XRF) apparatus;
   using the XRF apparatus to make an XRF measurement of the higher viscosity paste; and
   evaluating the XRF measurement to estimate an elemental composition of the obtained multiphase oilfield fluid.

2. The method of claim 1, wherein the obtained sample comprises a sample of drilling fluid used in a wellbore drilling operation.

3. The method of claim 2, further comprising adjusting an actual composition of drilling fluid in a mud pit in response to the estimated elemental composition.

4. The method of claim 1, wherein the viscosity modifying agent comprises carbon black.

5. The method of claim 1, wherein:
   the sample of the multiphase oilfield fluid is automatically obtained from a flow line, a mud pit, or a tank;
   the obtained sample is automatically blended with the viscosity modifying agent to transform the obtained sample into the higher viscosity paste; and
   the higher viscosity paste is automatically dispensed into a sample cup and transferred to the chamber of the XRF apparatus for making the XRF measurement.

6. The method of claim 1, wherein the evaluating the XRF measurement further comprises:
   developing a correlation between a peak height or an area under a peak in the XRF measurement and a concentration of an element in the multiphase oilfield fluid; and
   evaluating the peak height or the area under a peak in the XRF measurement with the correlation to estimate the elemental composition of the multiphase oilfield fluid.

7. The method of claim 1, wherein:
   the multiphase oilfield fluid is a dewatering fluid obtained from a high gravity solids (HGS) recovery system in a drilling fluid dewatering process; and
   the evaluating the XRF measurement further comprises evaluating the XRF measurement for at least one of barium, manganese, iron, or calcium to estimate an amount of HGS in the dewatering fluid.

8. The method of claim 7, further comprising adjusting an operational parameter of the HGS recovery system in response to the estimated amount of HGS in the dewatering fluid.

9. The method of claim 1, wherein:
   the multiphase oilfield fluid is a clean centrate fluid obtained from a low gravity solids (LGS) removal system in a drilling fluid dewatering process; and
   the evaluating the XRF measurement further comprises evaluating the XRF measurement for at least one of calcium, magnesium, silicon, aluminum, thorium, or uranium to estimate an amount of LGS in the clean centrate fluid.

10. The method of claim 9, further comprising adjusting an operational parameter of the LGS removal system in response to the estimated amount of LGS in the clean centrate fluid.

11. A system for estimating an elemental composition of a multiphase oilfield fluid, the system comprising:
    a fluid input port configured for receiving a sample of the multiphase oilfield fluid;
    a mixer configured to mix the received sample with carbon black to transform the received sample to a higher viscosity paste;
    an x-ray fluorescence (XRF) sample holder configured to receive the higher viscosity paste;
    an XRF measurement tool configured to make an XRF measurement of the high viscosity paste; and
    a processor configured to evaluate the XRF measurement to estimate an elemental composition of the multiphase oilfield fluid.

12. The system of claim 11, further comprising a carbon black containing vessel configured to transfer the carbon black to the mixer.

13. The system of claim 11, further comprising:
    a paste dispenser configured to transfer the higher viscosity paste to the sample holder; and
    a carrousel including a plurality of the sample holders.

14. The apparatus of claim 13, wherein:
    the mixer is configured to automatically receive the sample of the multiphase oilfield fluid and the carbon black and to automatically blend the received sample and the received carbon black to transform the received sample into the higher viscosity paste; and
    the paste dispenser is configured to automatically transfer the higher viscosity paste to the sample holder.

15. The system of claim 11, wherein:
    the processor comprises a correlation between a peak height or an area under a peak in the XRF measurement and a concentration of an element in the multiphase oilfield fluid; and
    the processor is further configured to evaluate the peak height or the area under a peak in the XRF measurement with the correlation to estimate the elemental composition of the multiphase oilfield fluid.

16. A method for evaluating a multiphase dewatering fluid, the method comprising:
    obtaining a sample of the multiphase dewatering fluid from a high gravity solids (HGS) recovery system or a low gravity solids (LGS) removal system in a dewatering process;
    blending the obtained sample with carbon black to transform the obtained sample into a paste; and
    making an XRF measurement of the paste to estimate an elemental composition of the dewatering fluid.

17. The method of claim 16, wherein:
the multiphase dewatering fluid is obtained from the HGS recovery system; and
the making the XRF measurement further comprises evaluating the XRF measurement for at least one of barium, manganese, iron, or calcium to estimate an amount of HGS in the multiphase dewatering fluid.

18. The method of claim 17, further comprising adjusting an operational parameter of a centrifuge in the HGS recovery system in response to the estimated amount of HGS in the dewatering fluid.

19. The method of claim 16, wherein:
the multiphase dewatering fluid is obtained from the LGS removal system; and
the making the XRF measurement further comprises evaluating the XRF measurement for at least one of calcium, magnesium, silicon, aluminum, thorium, or uranium to estimate an amount of LGS in the multiphase dewatering fluid.

20. The method of claim 19, further comprising adjusting an operational parameter of a centrifuge in the LGS removal system in response to the estimated amount of LGS in the multiphase dewatering fluid.

\* \* \* \* \*